US008483947B2

(12) United States Patent
Johnson et al.

(10) Patent No.: US 8,483,947 B2
(45) Date of Patent: Jul. 9, 2013

(54) BITMAP ARRAY FOR OPTIMALLY DISTRIBUTING MAP DATA CONTENT TO WIRELESS COMMUNICATIONS DEVICES

(75) Inventors: Eric Johnson, Ottawa (CA); Xiaming Xi, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 1731 days.

(21) Appl. No.: 11/837,172

(22) Filed: Aug. 10, 2007

(65) Prior Publication Data

US 2008/0268822 A1 Oct. 30, 2008

Related U.S. Application Data

(60) Provisional application No. 60/913,940, filed on Apr. 25, 2007.

(51) Int. Cl.
*H04M 3/42* (2006.01)

(52) U.S. Cl.
USPC ...... 701/409; 701/408; 701/400; 340/995.14; 340/995.17; 340/995.27

(58) Field of Classification Search
USPC .................. 345/677, 629, 641; 455/414.2
See application file for complete search history.

(56) References Cited

U.S. PATENT DOCUMENTS

| | | | | |
|---|---|---|---|---|
| 6,320,518 B2 * | 11/2001 | Saeki et al. | ............. | 340/995.12 |
| 6,452,544 B1 * | 9/2002 | Hakala et al. | ............. | 342/357.31 |
| 6,477,526 B2 * | 11/2002 | Hayashi et al. | ............... | 701/532 |
| 6,665,676 B2 * | 12/2003 | Twig et al. | ............................. | 1/1 |
| 6,904,360 B2 * | 6/2005 | Pechatnikov et al. | ......... | 701/532 |
| 7,006,155 B1 * | 2/2006 | Agarwala et al. | ............. | 348/592 |
| 7,158,878 B2 * | 1/2007 | Rasmussen et al. | .......... | 701/431 |
| 7,251,561 B2 * | 7/2007 | Dotan et al. | ................... | 701/421 |
| 7,254,271 B2 * | 8/2007 | Aguera y Arcas | ............ | 382/232 |
| 7,286,708 B2 * | 10/2007 | Aguera Y Arcas | ............ | 382/232 |
| 7,376,284 B2 * | 5/2008 | Tao et al. | ....................... | 382/285 |

(Continued)

FOREIGN PATENT DOCUMENTS

| | | |
|---|---|---|
| EP | 1 136 793 A2 | 9/2001 |
| WO | 2006096044 A1 | 9/2006 |

OTHER PUBLICATIONS

European Search Report for EP Application No. 07 11 4200, mail Jan. 4, 2008.

(Continued)

*Primary Examiner* — Thomas Black
*Assistant Examiner* — Wae Louie
(74) *Attorney, Agent, or Firm* — Gowling Lafleur Hendreson LLP

(57) ABSTRACT

A method of distributing map data from a map server to a wireless communications device entails generating a bitmap array representative of the vector map data for a given zoom level, computing attributes of the bitmap array to determine which map features to retain and which map features to suppress, and then transmitting to the wireless device only the map data for the map features to be retained. By counting the number of bitmap cells representing a polygonal map feature such as a park, lake, or island, the approximate area is quickly estimated. If the area falls below a threshold, the map data for the small polygon is discarded. Similarly, if a polyline map feature overlaps (or is too proximate to) another polyline map feature, one of the polyline map features is discarded. The map data actually transmitted is thus reduced, thereby economizing bandwidth without unduly sacrificing map detail.

26 Claims, 14 Drawing Sheets

U.S. PATENT DOCUMENTS

| | | |
|---|---|---|
| 7,379,811 B2 * | 5/2008 | Rasmussen et al. ........... 701/532 |
| 7,392,133 B2 * | 6/2008 | Maruyama et al. ........... 701/423 |
| 7,688,227 B1 * | 3/2010 | Tosun et al. ................. 340/995.1 |
| 7,734,412 B2 * | 6/2010 | Shi et al. ........................ 701/421 |
| 7,894,984 B2 * | 2/2011 | Rasmussen et al. ........... 701/452 |
| 7,940,271 B2 * | 5/2011 | Wright et al. .................. 345/440 |
| 2001/0045949 A1 | 11/2001 | Chithambaram et al. |
| 2005/0270311 A1 * | 12/2005 | Rasmussen et al. ........... 345/677 |
| 2008/0268822 A1 * | 10/2008 | Johnson et al. ............ 455/414.2 |

OTHER PUBLICATIONS

First Detailed Office Action from the Chinese Patent Office with English Translation (dated Oct. 26, 2010) Complete document is relevant.

* cited by examiner

US 8,483,947 B2

BITMAP ARRAY FOR OPTIMALLY DISTRIBUTING MAP DATA CONTENT TO WIRELESS COMMUNICATIONS DEVICES

CROSS-REFERENCE TO RELATED APPLICATIONS

This application claims priority under 35 U.S.C. §119(e) from U.S. Provisional Patent Application 60/913,940 entitled BITMAP ARRAY FOR OPTIMALLY DISTRIBUTING MAP DATA CONTENT TO WIRELESS COMMUNICATIONS DEVICES filed Apr. 25, 2007.

TECHNICAL FIELD

The present disclosure relates generally to wireless communications devices and, in particular, to techniques for distributing map content to wireless communications devices.

BACKGROUND

Wireless communications devices such as the BlackBerry® by Research in Motion Limited enable users to download map content from web-based data sources such as BlackBerry Maps™ or Google Maps™. In the case of BlackBerry Maps™, the map data is in vector format, meaning that parks, lakes, oceans, islands, land masses, etc. are represented with polygons while highways, streets, railroads, etc. are represented with polylines. Mathematically, polygons and polylines are sets of coordinate points (the points being defined in terms of latitude and longitude).

When a user wishes to view a map on his or her wireless communications device, the user selects a location or area of interest (AOI) which triggers a request by the client device to the map server for the map data corresponding to the specific area or location requested by the user. The server retrieves the map data and sends the map data back to the client device to enable the device to dynamically render the map using the received map data. In the context of BlackBerry Maps™, the server first replies with an index of all available map data for the area of interest (AOI) which enables the device to select only those aspects of the map data it requires, thus economizing wireless bandwidth. Despite the use of this indexing technique for reducing over-the-air data transmission, the amount of data that is transmitted for an area of interest may still be very large. Particularly, when the user requests a map at a high zoom level (e.g. 10 km×10 km or greater), the amount of vector data being transmitted is excessive given the low level of detail being sought, i.e. only a fraction of all of the map data actually being transmitted to the wireless device is actually used in rendering the map. For example, as depicted in FIG. 1, a large-scale map of central North America shows not only the five Great Lakes but also myriad smaller lakes, providing a level of detail that most users do not necessarily require or expect. Downloading all this "extraneous" map vector data unnecessarily burdens the wireless link without providing any real benefit to user. Likewise, as depicted in FIG. 2, a map showing a highway interchange with on-ramps, exit ramps and service roads, may provide excessive detail for a user requesting a map at that zoom level. Furthermore, at that zoom level, the roads may appear to overlap, thus confusing the user and posing problems for on-screen labelling.

Accordingly, a technique for more optimally distributing map data content to wireless communications devices remains highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
FIG. 1 is a screenshot of a large-scale map of central North America showing providing an undesirably high level of detail that is typical of most current mapping applications.

The present technology provides, in general, a method for more efficiently distributing map content to wireless communications devices by processing vector map data at the map server using a bitmap array to efficiently analyze polygonal map features (such as lakes, islands, parks, etc.) and/or polyline map features (such as highways, streets, roads) to determine whether to retain the features or whether to suppress them (as being unnecessarily detailed) or overlapping or partially overlapping. A bitmap array is generated for a given zoom level wherein each bitmap cell of the bitmap array represents a discrete portion of the vector map data. Efficient analysis of map features can be done by computing attributes of the bitmap array. For example, the area of a polygonal map feature can be approximated by summing the number of bitmap cells representing the polygonal map feature. If the approximated area is less than a threshold, the polygonal map feature is suppressed as being unduly small (too much detail). For polyline map features, these features can be prioritized (in terms of importance or size) and corresponding cells marked for the highest-priority polyline. Subsequent polylines are marked on the array unless they coincide with a previously marked cell. Unmarked cells and marked cells are counted and their ratio is compared to a threshold to determine whether two polylines overlap or partially overlap. If so, the lower-priority polyline is suppressed (or alternatively merged into the higher-priority polyline). Similarly, a buffer can be created beside a polyline to ensure minimal spacing between adjacent polylines. This overlap and proximity analysis can be applied not only to polylines but also to polygons so as to ensure that polygonal map features do not overlap when rendered or, alternatively, to ensure that polygonal map features are not rendered too close to one another. Accordingly, unduly detailed features of the map that are not useful or necessary at a given zoom level are suppressed, so that the total amount of map data transmitted to the wireless communications device is minimized. As a result, wireless bandwidth is conserved without unduly sacrificing map content detail. Parameters such as bitmap size, bitmap resolution, threshold, and buffer width can be tuned to enable a user (of the client device) or a system administrator (server side) to adjust the degree of map detail to be provided. Once the vector map data has been collapsed to the bitmap and a decision has been made as to which features to omit (i.e. suppress or remove), the map data associated with the remaining features can be transmitted in vector format or, alternatively, the bitmap itself can be transmitted (in which case the device receives the bitmap that has been collapsed from the vector map data). This process of "data simplification" or "data generalization" (by generating and analyzing the bitmap) can be done in real-time, although it may be more efficient to pre-process the bitmaps for different zoom levels.

Thus, an aspect of the present technology is a method of distributing map data from a map server to a wireless communications device. The method entails obtaining vector map data in response to a request for map data received at the map server from the wireless communications device, generating a bitmap array representative of the vector map data for a zoom level specified in the request, computing attributes of the bitmap array to determine which map features are to be retained and which map features are to be suppressed, and transmitting to the wireless communications device only the map data for the map features to be retained.

Another aspect of the present technology is a computer program product that includes code adapted to perform the foregoing method steps when the computer program product is loaded into memory and executed on a processor of a wireless communications device.

Yet another aspect of the present technology is a map server for distributing map data to the wireless communications devices. The server has a data port for receiving a request from the wireless communications device for map data and a processor coupled to memory to: process the request and obtain vector map data in response to the request for map data; generate a bitmap array representative of the vector map data for a zoom level specified in the request; compute attributes of the bitmap array to determine which map features are to be retained and which map features are to be suppressed; and transmit to the wireless communications device, via the data port, only the map data for the map features to be retained.

Yet a further aspect of the present technology is a wireless communications device having an input device for enabling a user to request map data, a processor coupled to memory for communicating a request to a map server, and a display for displaying a map rendered from map data received from the map server, the map server transmitting only the map data associated with map features that are to be retained after processing the map data using a bitmap array from which attributes of the map features are computed in order to determine whether to retain or omit map features.

Yet another aspect of the present technology is a method of processing vector map data in a map server, the method including steps of generating a bitmap array representative of the vector map data for a particular location specified in a request for map data received by the map server, computing attributes of the bitmap array to determine which map features are to be retained and which map features are to be omitted, and making available for transmission to a wireless communications device only the map data for the map features to be retained.

The details and particulars of these aspects of the technology will now be described below, by way of example, with reference to the attached drawings.

Figure 3:
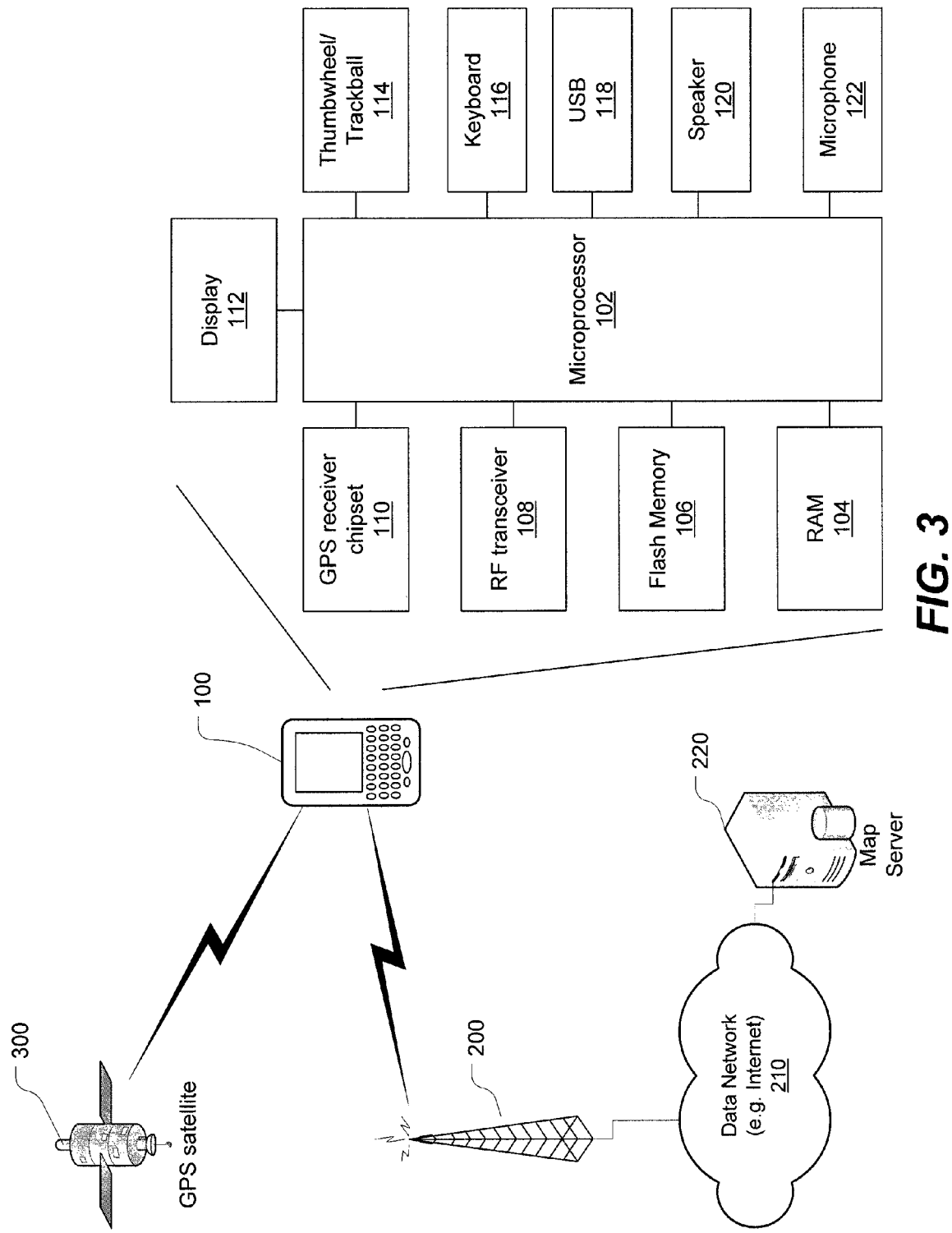
FIG. 3 is a block diagram of key components of a wireless communications system for implementing the present technology.

FIG. 3 is a block diagram of key components of a wireless communications system for implementing the present technology. It should be expressly understood that this figure is intentionally simplified to show only certain components; the system, map server and wireless communication device of course each include other components beyond those shown in FIG. 3.

As depicted in FIG. 3, the system includes a wireless communications device 100 that has a microprocessor 102 (or simply a "processor") which interacts with memory in the form of RAM 104 and flash memory 106, as is well known in the art. The device 100 includes an RF (radio-frequency) transceiver 108 for communicating wirelessly with one or more base stations 200. The device 100 may optionally include a GPS (Global Positioning System) receiver chipset 110 for receiving GPS radio signals transmitted from one or more orbiting GPS satellites 300. In terms of input/output devices or user interfaces (UI), the device 100 typically includes a display 112 (e.g. a small LCD screen), a thumbwheel and/or trackball 114, a keyboard or keypad 116, a USB 118 or serial port for connecting to peripheral equipment, a speaker 120 and a microphone 122. The processor and memory thus enable a mapping application, such as BlackBerry Maps™, to run on the wireless device for enabling a user of the device to download and view map content through the Internet 210 from a map server 220. Similarly, the processor and memory can enable other location-based services (LBS) applications to run on the device, such as turn-by-turn navigation. The speaker 120, microphone 122 and RF transceiver circuitry 108 form part of a voice communication subsystem that enables cellular communication.

Figure 4:
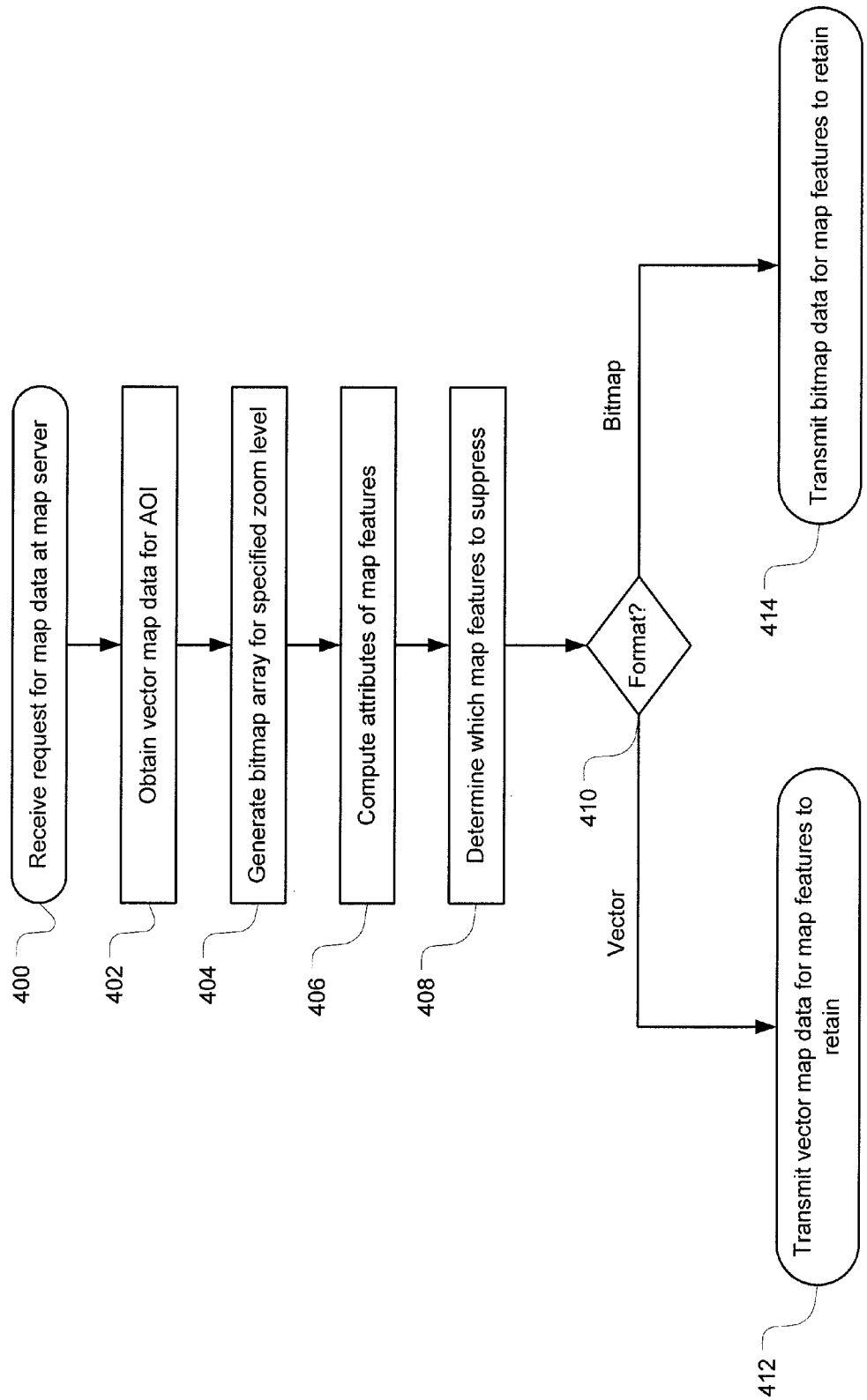
FIG. 4 is a flowchart outlining steps of a method of distributing map content to wireless communications devices in accordance with the present technology where the processing of the bitmap is done in real-time.

FIG. 4 is a flowchart outlining steps of a method performed in real-time at the map server 220 of distributing map content to one or more wireless communications devices in accordance with the present technology. As depicted in FIG. 4, an initial step 400 entails receiving a request from a wireless communications device for map data. In response to this request, vector map data is obtained (step 402) for the area of interest (AOI). Vector map data is obtained from the map server's own database or from other connected map servers or databases. At step 404, the map server generates a bitmap array representative of the vector map data for a zoom level specified in the request. At step 406, the map server computes attributes of the bitmap array to determine (at step 408) which map features are to be retained and which map features are to be suppressed. At step 410, the map server decides whether to transmit the data to the wireless communications device 100 in vector format or as a bitmap. At step 412, if the decision is to transmit in vector format, the map server 220 transmits to the wireless communications device only the vector map data for the map features to be retained. Alternatively, at step 414, the map server can simply transmit the bitmap itself to the wireless communications device.

Figure 5:
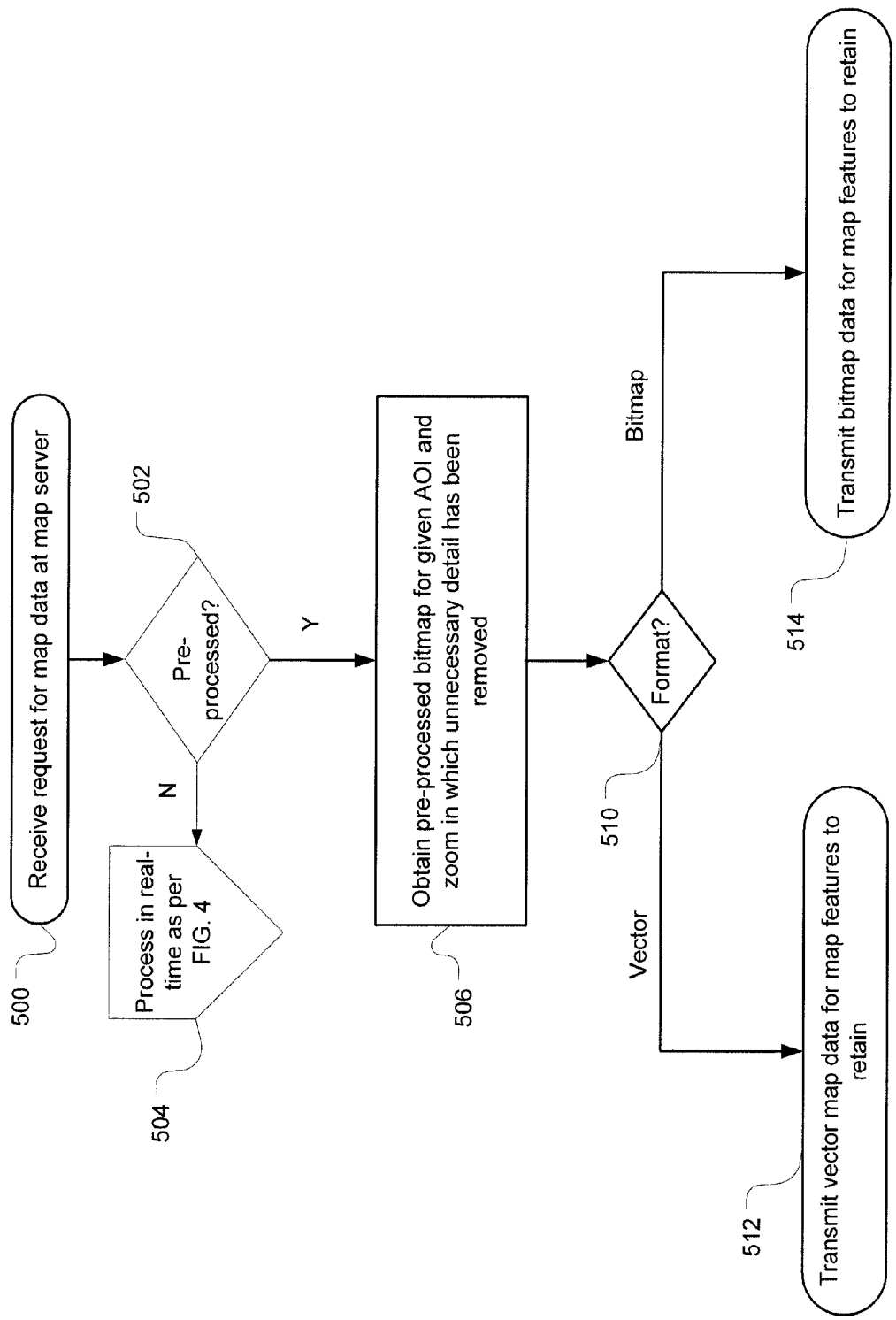
FIG. 5 is a flowchart outlining steps of a method of distributing map content to wireless communications devices in accordance with the present technology where the bitmap is pre-processed.

FIG. 5 is a flowchart outlining steps of another method of distributing map content to one or more wireless communications devices in accordance with the present technology where all or a portion of the map data is pre-processed at the map server according to different zoom levels. Upon receipt of a request for map data (step 500), the map server determines whether there is pre-processed data for the given AOI and zoom (step 502). If no, the map server generates the bitmap and performs the data simplification calculations in real-time (step 504) as per the flowchart of FIG. 4. If yes, then the map server obtain the pre-processed map data for the given AOI and zoom (step 506). The map server decides whether to send the data in vector format or as a bitmap (step 510) and then sends either in vector format (step 512) or as a bitmap (step 514). Alternatively, the bitmap can be re-converted back into vector format to further simplify or generalize the data. For example, depending on the nature of the map features, this re-conversion back to vector format may have the effect of smoothing out a winding road or rounding off the jagged edge of a polygon. In each of these cases, however, the data transmitted by the map server to the client device is less than what is conventionally sent over the air, thereby economizing over-the-air bandwidth.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

Figure 6:
FIG. 6 is a screenshot of the same portion of central North America as was presented in FIG. 1 but having simplified map content in which all of the small lakes are omitted.

FIG. 6 is a screenshot of the same portion of central North America as was presented in FIG. 1 but having simplified map content in which all of the small lakes are suppressed, thus reducing the amount of data that is transmitted over the air. By comparing FIG. 6 with FIG. 1, it is apparent that the level of detail is reduced (the small lakes are removed or suppressed) but that, given the large scale of the map, it still has practical utility to the user.

Figure 2:
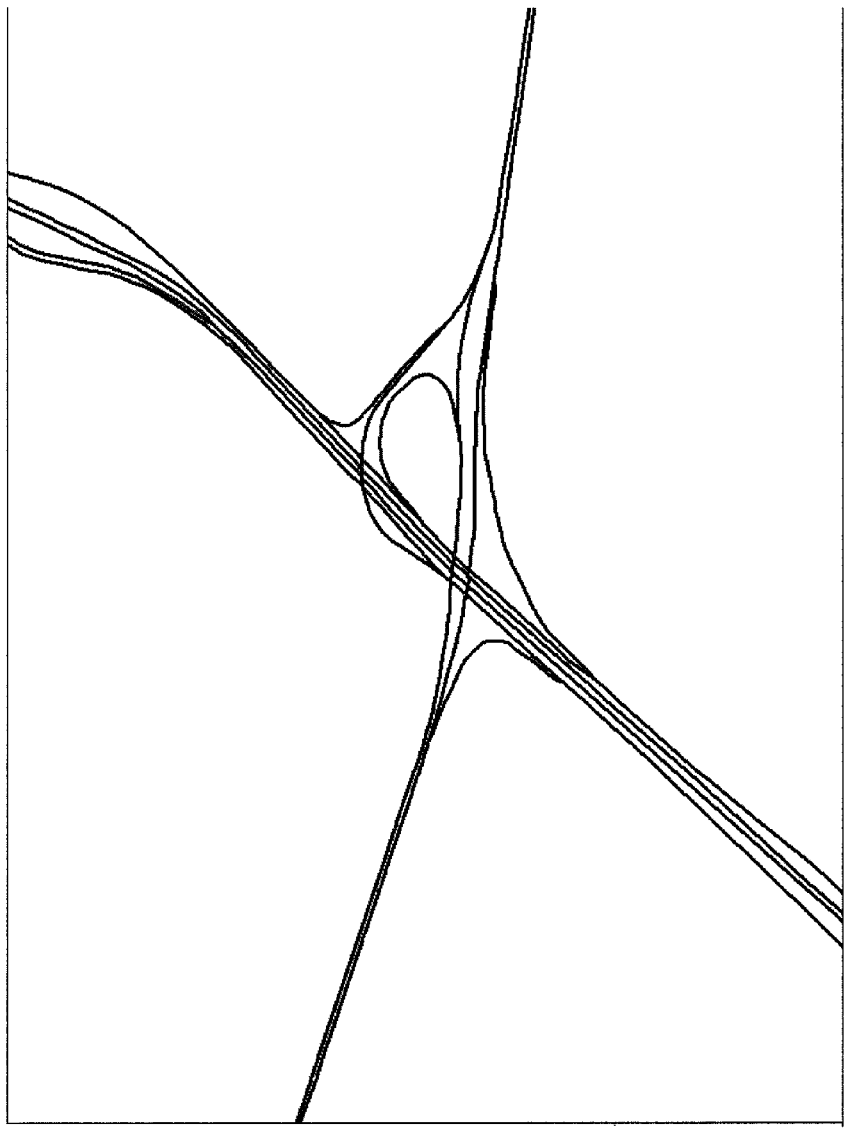
FIG. 2 is a screenshot of a highway interchange also providing an undesirably high level of detail resulting in the appearance of overlapping and partially overlapping roadways.
Figure 7:
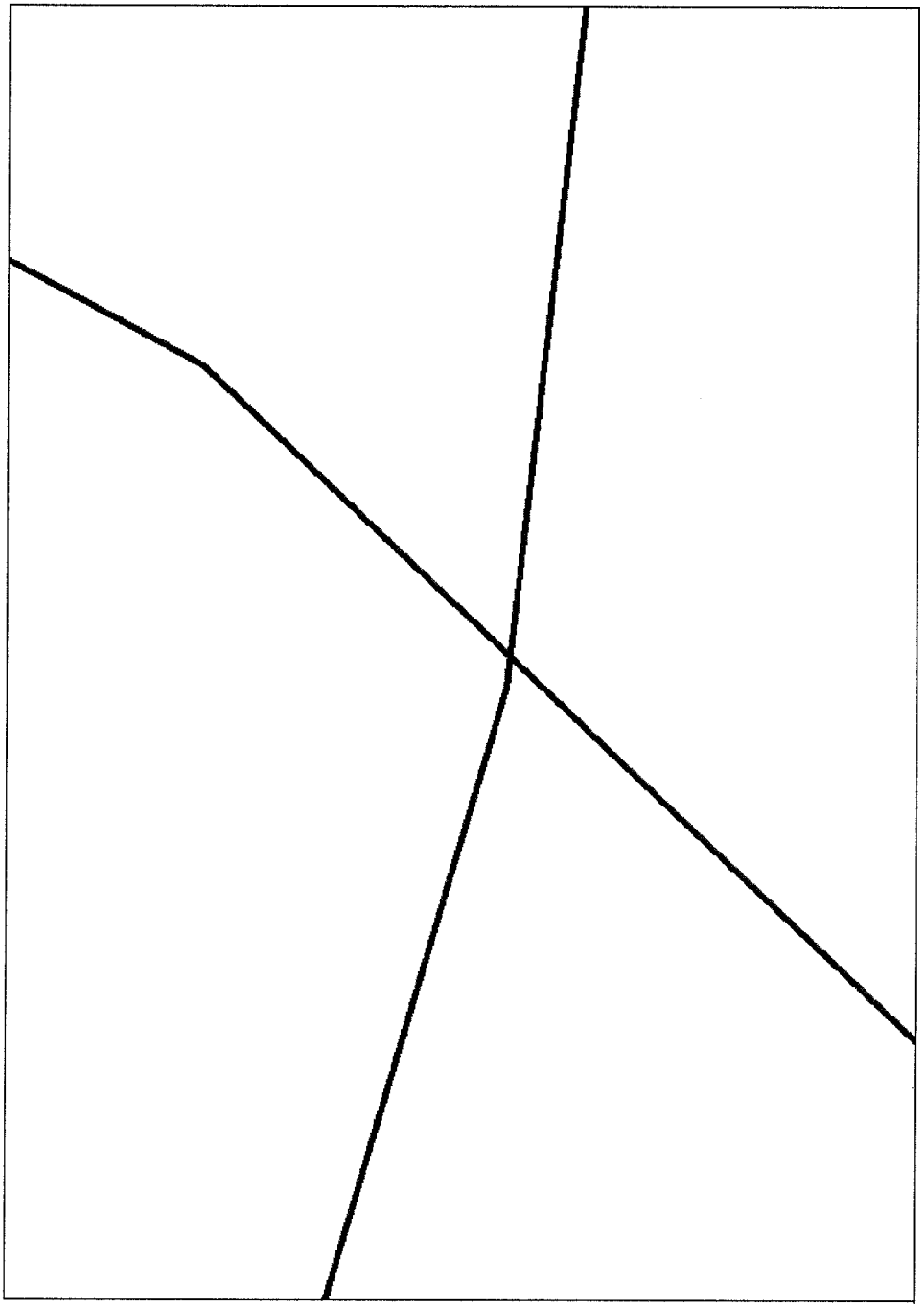
FIG. 7 is a screenshot of the same interchange as was presented in FIG. 2 but having simplified map content in which overlapping or partially overlapping roadways are suppressed.

FIG. 7 is a screenshot of the same interchange as was presented in FIG. 2 but having simplified map content in which overlapping or partially overlapping roadways are suppressed. Again, not only is the data charge reduced, but the map has virtually the same practical utility to the user (if not more because the overlapping roadways may confuse the user and may give rise to onscreen labelling issues).

Described below are further implementation details for generating the bitmap array and for computing attributes of polygonal map features (such as lakes, parks, islands, land masses, etc.) and/or for polyline map features (highways, streets or other types of roadways or railways).

Figure 8:
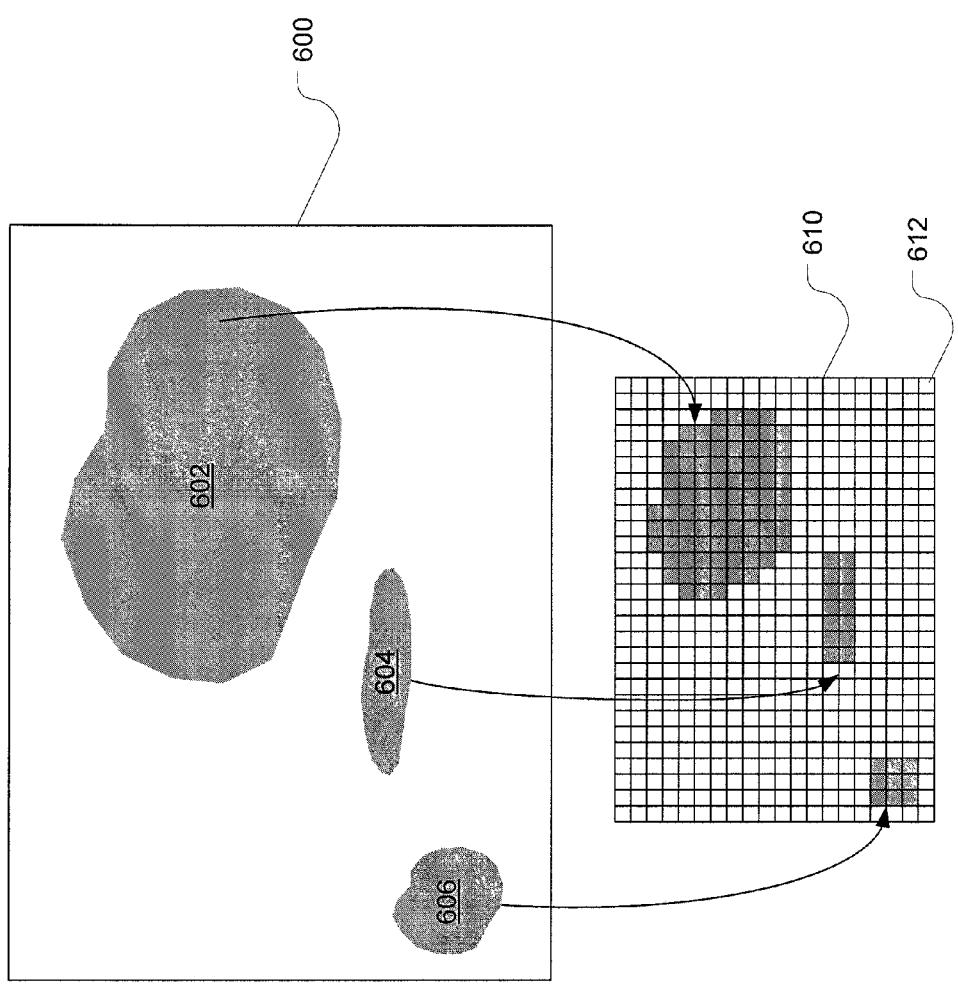
FIG. 8 depicts a bitmap array generated by collapsing vector map data for a map showing three differently sized lakes.

For polygons, FIG. 8 schematically depicts a map 600 (actually the bounding box or AOI) showing three lakes, a big lake 602, and two small lakes 604 and 606. Ordinarily, using conventional mapping technology, the vector map data for all three lakes would be transmitted over the air to the client device, thus burdening the wireless link even if the level of detail at that particular zoom level is unnecessary or unwanted. In accordance with the technology presented herein, the map server "prunes" or simplifies the vector map data by generating a bitmap array 610 representative of the AOI or bounding box. The bitmap array 610 is an m×n two-dimensional array of bitmap cells 612 (i.e. m columns and n rows). In one example, if processing is done dynamically, the size of the bitmap array (or "bitmap board") would match the size of the bounding box or screen. Depending on the resolution or granularity sought, a magnification factor (or scale-down ratio) is defined. Bitmap size m equals the longitude (right-side coordinate minus left-side coordinate in degrees) multiplied by the factor while n equals latitude (top-side coordinate minus bottom-side coordinate in degrees) multiplied by the factor. For example, if one wants a bitmap cell representing 1 meter by 1-meter earth square (at the equator), the magnification factor would be approximately 90,000. A bitmap board (bitmap array) representing a world map with this resolution would be 32,400,000 by 16,200,000 in size.

As shown in FIG. 8, the conversion from vector format to bitmap format effectively discretizes the vector map data to provide an efficient means to compute attributes of the polygonal map features such as the lakes shown in this figure. Thus, if the data simplification entails suppressing lakes that are too small and thus probably inconsequential at this level of zoom, then the area of the lake in its bitmap representation can be approximated by simply counting the total number of bitmap cells representing the lake. For example, lake 606 is represented by 9 cells while lake 604 is represented by 14 cells. In contrast, lake 602 has 86 cells. Thus, if the polygonal area threshold were set at, say, 20, lakes 604 and 606 would be suppressed as being too small at to be relevant at that zoom level while lake 602 would be retained as being sufficiently large. Accordingly, the map server would only transmit the map data corresponding to lake 602, having removed or suppressed the map data corresponding to lakes 604 and 606. The size of the bitmap, the resolution of the bitmap and the threshold are parameters that can be tuned to achieve a desired level of map detail.

Figure 9:
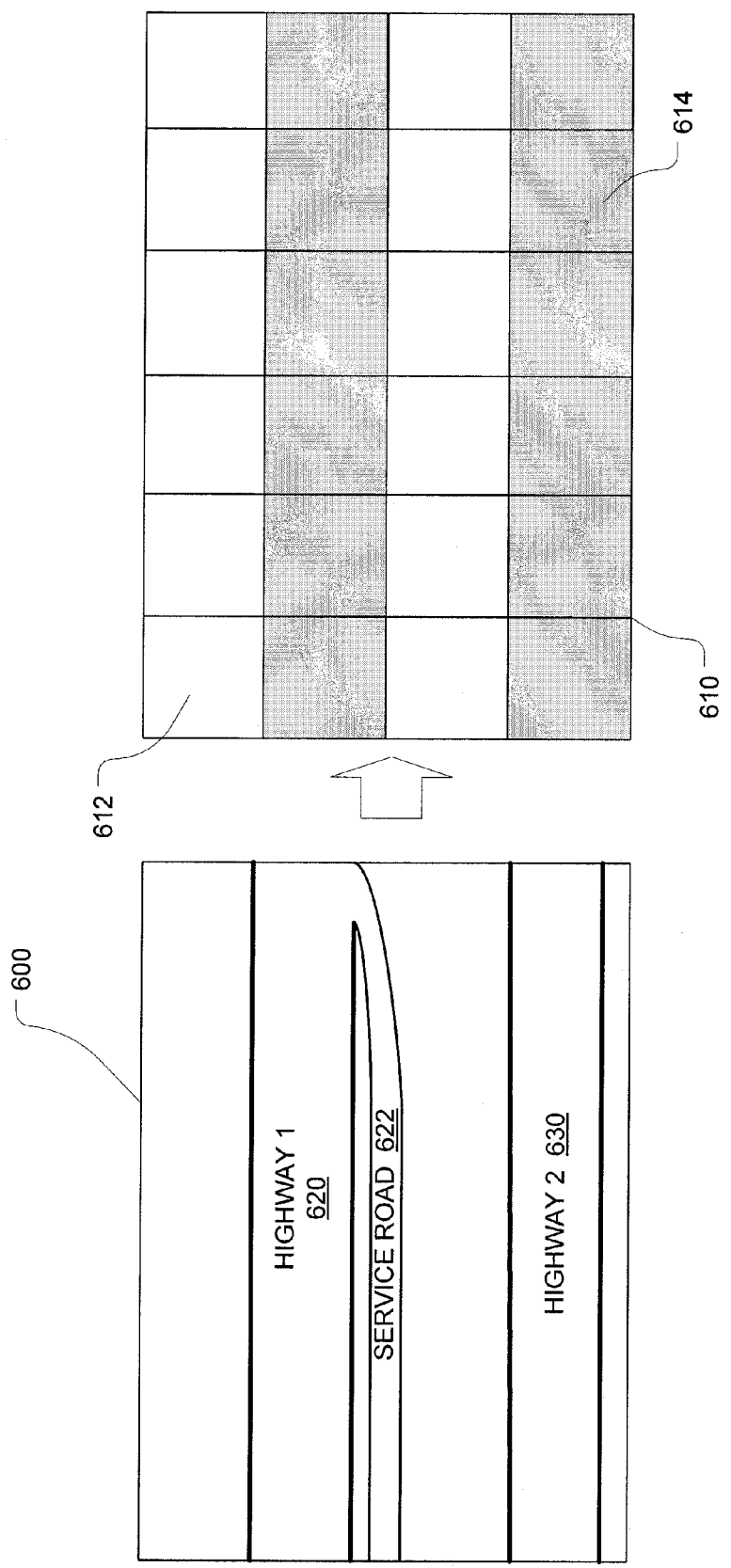
FIG. 9 depicts a bitmap array generated by collapsing vector map data for map having a street overlapping with a highway.

For polylines, FIG. 9 schematically depicts a map (or bounding box) 600 which, using conventional mapping tools, would ordinarily transmit and render map data for more map detail than is reasonably necessary or expected by the user at that particular zoom level. In this particular example, the map contains vector map data for rendering a first roadway "Highway 1" denoted by reference numeral 620, a second roadway "Service Road" denoted by reference numeral 622, which is a minor roadway in comparison to the highway, and a third roadway "Highway 2" denoted by reference numeral 630. By generating a bitmap array 610 having (simply by way of example) 6 columns and 4 rows of bitmap cells 612, the vector map data is discretized and collapsed into bitmap format. In so doing, major (high-priority) roadways are marked on the array by marking cells corresponding to the vector map data for the major roadways.

As depicted in FIG. 9, the marked cells 614 are greyed out in this figure, as was done in the previous figure. This bitmap array is shown with a much lower resolution than the bitmap array shown in the previous figure to illustrate that the resolution (granularity) of the bitmap array 610 (or bitmap board) can be varied. In the example presented in FIG. 9, the granularity is larger (lower resolution), thus potentially discarding or suppressing more data than if the granularity were lesser (higher resolution).

In any event, the major roadways (Highway 1 and Highway 2) are "drawn" on the array first by marking cells representing these discretized major roadways. Then, the map server will try to "draw" or mark a lesser roadway (lower priority street) on the array (in this example, Service Road 622) but the cells corresponding to Service Road 622 in the bitmap array are already occupied by the higher-priority Highway 1 (620). Therefore, this Service Road 622 is considered to overlap with a higher-priority roadway, and consequently should be discarded or suppressed at this level of zoom, because, even if bandwidth and processing resources were expended to transmit and render the data for this lesser roadway, once rendered onscreen, it would appear to overlap or partially overlap Highway 1, a result that would not be aesthetically pleasing and which might furthermore pose labelling issues, or potentially cause the user confusion when referring to the map.

In determining whether one polyline map feature (e.g. roadway) overlaps or partially overlaps another polyline map feature, at least two things should be done. Firstly, polylines should be prioritized so that higher-priority (i.e. more important) polylines are marked first so that it is the lower-priority polylines (e.g. roadways of lesser importance) that are liable to be suppressed, and not the other way around. Prioritizing polylines such as roadways can be done according to one or more of a plurality of factors consisting of: a class of the roadway (interstate highway, regional road, street, etc.), an importance rating of the roadway (which can be subjectively or objectively predetermined and stores as metadata), a speed limit associated with the roadway, and a length of the roadway.

Secondly, once the priority is established for polyline map feature, the following method can be used to determine whether any polyline map features are to be suppressed or removed: first, as described above, bitmap cells are marked in the bitmap array corresponding to a first polyline map feature (for a high-priority feature). Second, as described above, bitmap cells are marked in the bitmap array corresponding to a second polyline map feature (of lesser priority) provided that the bitmap cells to be marked for the second polyline map feature do not coincide with the bitmap cells already marked for the first polyline map feature, thus providing a tally of marked cells and unmarked cells for the second polyline map feature with respect to the first polyline map feature. Once the tally or count of marked and unmarked cells is completed, the map server compares a ratio of the marked cells to the unmarked cells against a threshold to determine whether the second polyline map feature is considered to overlap (or partially overlap) the first polyline map feature. This threshold is also a parameter that can be tuned to provide a variable degree of discrimination between neighbouring roadways or other polyline map features. An alternative technique for determining whether two features overlap is to compute a ratio of marked cells to the total number of cells that would be required to represent the map feature. It should also be noted that these techniques for determining whether a polyline map feature overlaps or partially overlaps another polyline map feature can also be used to determine whether a polygonal map feature overlaps or partially overlaps another polygonal map feature.

Figure 10:
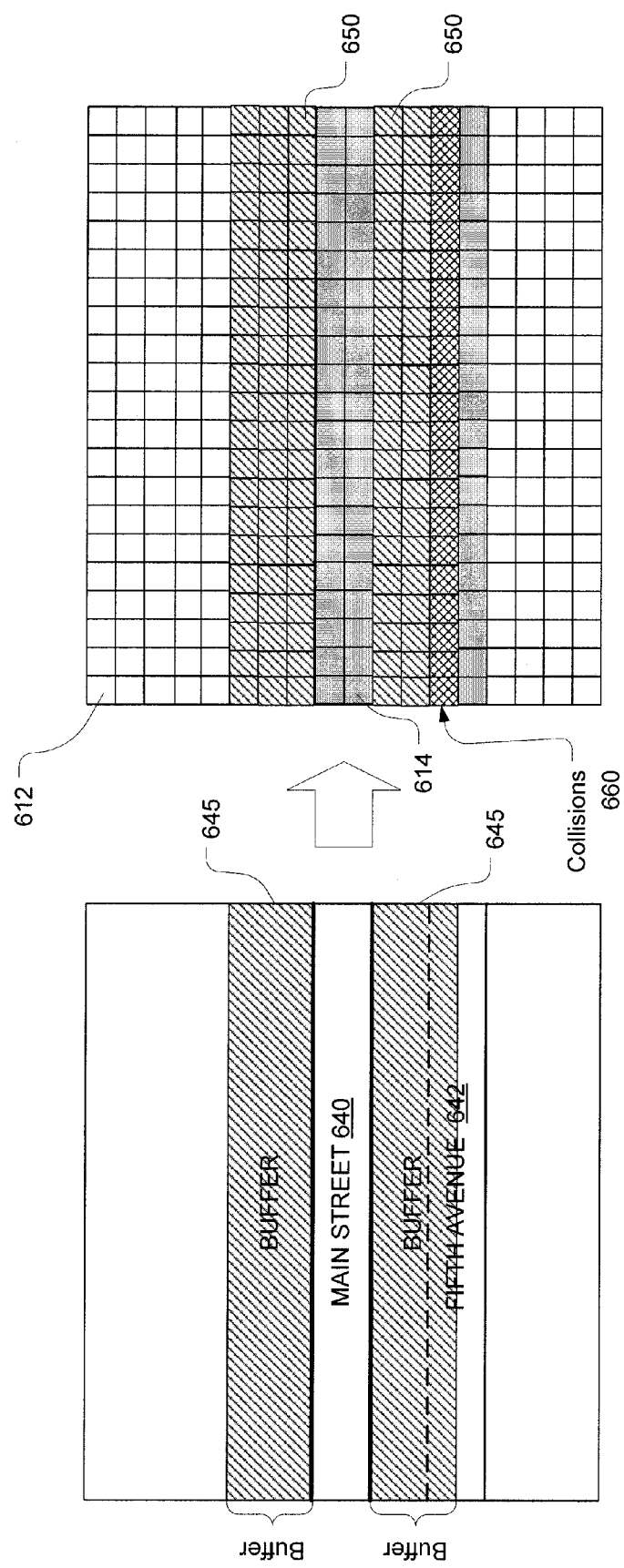
FIG. 10 depicts a bitmap array generated using buffer cells to ensure that roadways (or other polyline map features) are not too proximate to one another.
Figure 12:
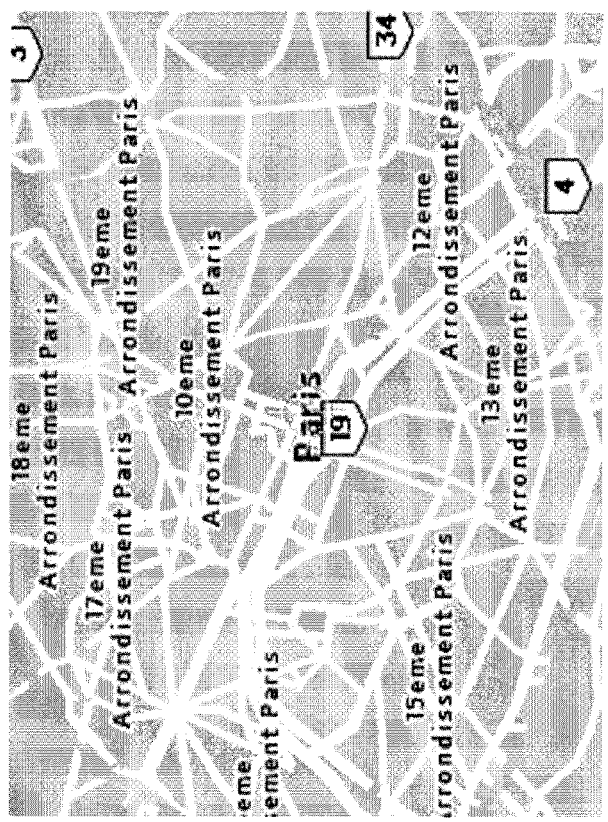
FIG. 12 is a screenshot of a large-scale map of Paris after the map data has been processed according to the present technology.
Figure 11:
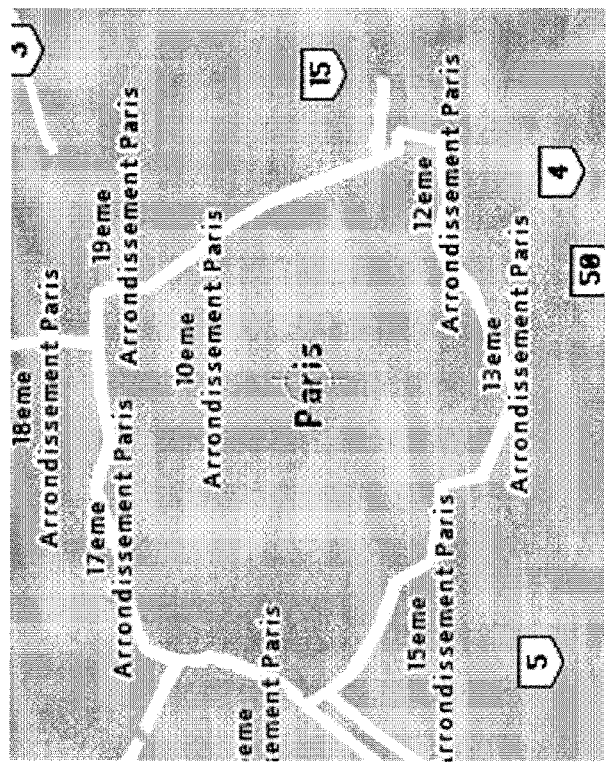
FIG. 11 is a screenshot of a large-scale map of Paris providing an undesirably high level of detail that is typical of most current mapping applications depicts.

FIG. 10 depicts a bitmap array 610 generated using buffer cells 650 to ensure that roadways (or other polyline map features) are not too proximate to one another. In the example presented in FIG. 10, a map 600 would ordinarily be rendered using conventional mapping technology with a first roadway "Main Street" denoted by reference numeral 640 in close proximity to another roadway "Fifth Avenue" denoted by numeral 642. Using conventional technology, however, often results in roadways or other polylines being rendered too close to each other in a manner that is unaesthetic and possibly also confusing. Using the present technology, the map server can also generate the bitmap array 610 by defining buffer cells 650 corresponding to a buffer 645 running along each side of the high-priority roadway Main Street (640) to ensure that no other street (e.g. Fifth Avenue) is rendered within the buffer zone, i.e. too proximate to Main Street. In this example, Fifth Avenue (642) falls within the buffer 645. In the bitmap array 610, collisions 660 are detected when the map server attempts to mark cells corresponding to Fifth Avenue but "discovers" that some of these cells have already been marked as buffer cells 650. If the ratio of collisions (unmarked cells) to marked exceeds a predetermined threshold, the roadway or other polyline map feature will be suppressed or removed. This threshold is a parameter that can be tuned by the user (client side) or by the system administrator (server side). Similarly, the width of the buffer is another parameter that can be tuned to regulate the degree of map detail to be provided. The buffering technique can thus be summarized as follows: first, the map server marks bitmap cells in the bitmap array corresponding to a first polyline map feature while also marking neighbouring bitmap cells to define a buffer of buffer cells immediately on each side of the bitmap cells corresponding the first polyline map feature. The number of neighbouring cells that are marked is a function of the granularity of the array and the desired width of the buffer. While a buffer of uniform width is preferable, in certain cases it may be useful to define a buffer of non-uniform width. For example, the buffer may be thickened at the midpoint of the polyline to provide ample screen space for labelling the polyline feature. Once the first polyline is marked on the array, the map server then marks bitmap cells in the bitmap array corresponding to a second polyline map feature provided that the bitmap cells to be marked for the second polyline map feature do not coincide with the bitmap cells already marked for the first polyline map feature or with the buffer cells of the first polyline map feature, thus providing a tally of marked cells and unmarked cells for the second polyline map feature with respect to the first polyline map feature and its buffer. The map server then compares a ratio of the marked cells to the unmarked cells against a threshold to determine whether the second polyline map feature is considered to either overlap or be too proximate to the first polyline map feature. As a result of this process, the map server eliminates data corresponding to polyline map features that would either overlap or be too proximate to other polylines. Collapsing the rich vector map data into a simplified bitmap strips out extraneous detail without unduly sacrificing the readability of the map. In other words, at high zoom levels, minute map details or map content that is generally considered inconsequential is excised or suppressed to enable efficient transmission of data to the wireless communications devices, thus economizing wireless bandwidth. This is further illustrated, again by way of example, with references to FIG. 11 and FIG. 12, both of which show a large-scale map of Paris. In FIG. 11, the map is rendered with full detail as per conventional mapping technology. In FIG. 12, the map is rendered after processing the map data according to the present technology, which removes or suppresses unnecessarily detailed map features.

The foregoing techniques can be used at any zoom level, although they are generally directed to large scale AOI's (e.g. 10 km by 10 km) where minute map details are generally not relevant to the user of the device. By filtering out polygons with small areas and/or collapsing/eliminating several polyline into a single polyline, the map data can be greatly simplified. As noted previously, this data simplification (or data generalization) can be done either in real-time or the data can be pre-processed for various different zoom levels. Data can be pre-processed data for groups of zooms levels (e.g. zoom levels 1-4, zoom levels 5-8, etc.) or for each individual zoom level. Irrespective of whether the data is pre-processed or processed in real-time, the map server can transmit the collapsed vector data or the resultant bitmap, depending on the system configuration and/or the preferences of the user of the wireless device.

Figure 13A:
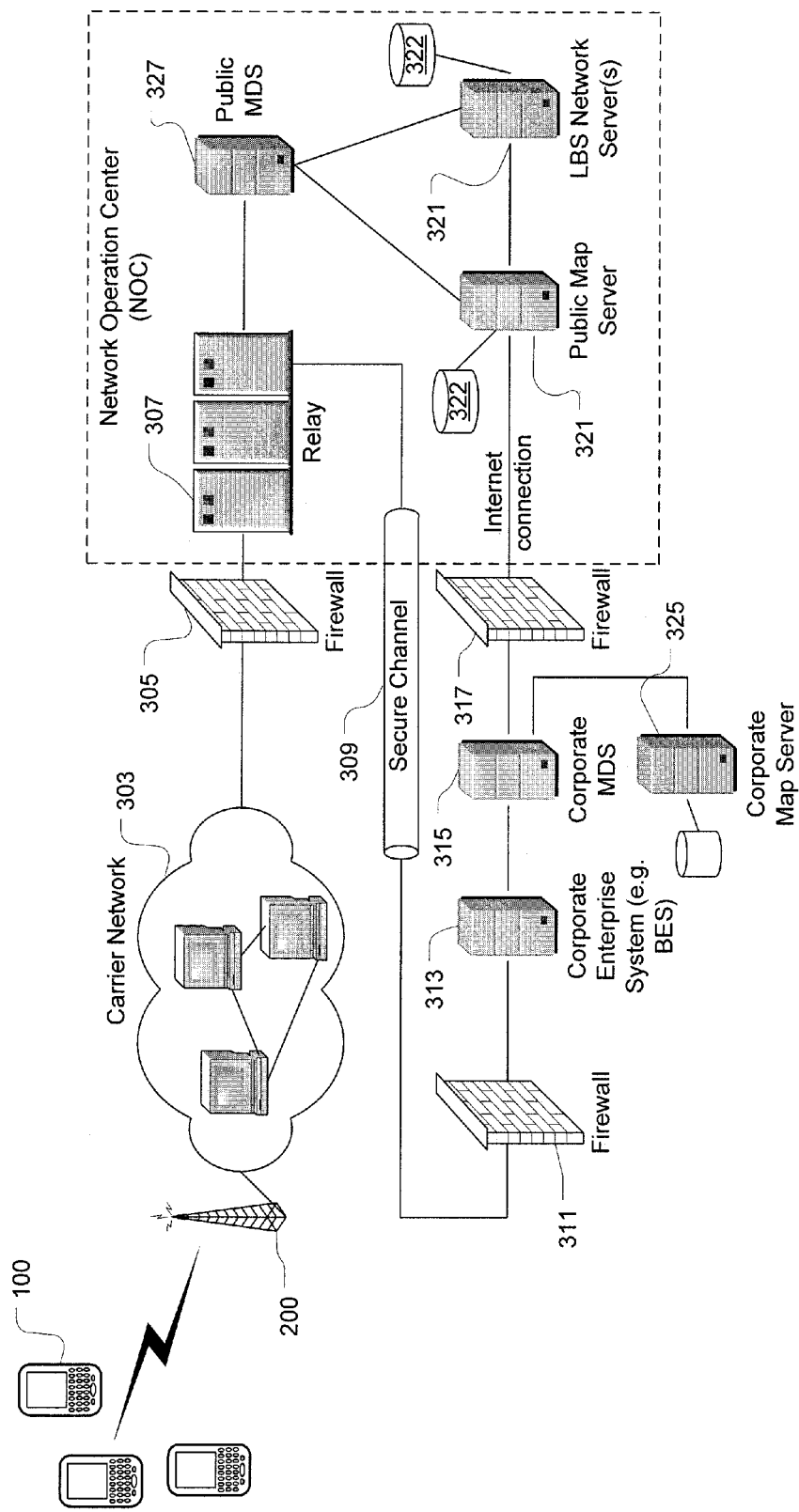
FIG. 13A is a system diagram of network components which provide mapping functionality for wireless communication devices.

FIG. 13A is a system diagram of network components which provide mapping functionality in wireless communication devices 100. To achieve this, a mapping application is also provided in memory of the wireless communications device for rendering visual maps in its display. Wireless communications devices 100 are connected (via base station 200) over a mobile carrier network 303 for communication through a firewall 305 to a relay 307. A request for map data from any one of the wireless communications devices 100 is received at relay 307 and passed via a secure channel 309 through firewall 311 to a corporate enterprise server 313 and corporate mobile data system (MDS) server 315. The request is then passed via firewall 317 to a public map server and/or to a public location-based service (LBS) server 321 which provides location-based services (LBS) to handle the request. The network may include a plurality of such map servers and/or LBS servers where requests are distributed and processed through a load distributing server. The map/LBS data may be stored on this network server 321 in a network database 322, or may be stored on a separate map server and/or LBS server (not shown). Private corporate data stored on corporate map/LBS server 325 may be added to the public data via corporate MDS server 315 on the secure return path to the wireless device 100. Alternatively, where no corporate servers are provided, the request from the wireless device 100 may be passed via relay 307 to a public MDS server 327, which sends the request to the public map/LBS server 321 providing map data or other local-based service in response to the request. For greater clarity, it should be understood that the wireless devices can obtain map data from a "pure" map server offering no location-based services, from an LBS server offering location-based services in addition to map content, or from a combination of servers offering map content and LBS.

A Maplet data structure is provided that contains all of the graphic and labelled content associated with a geographic area (e.g. map features such as restaurants (point features), streets (line features) or lakes (polygon features)). Maplets are structured in Layers of Data Entries ("DEntries") identified by a "Layer ID" to enable data from different sources to be deployed to the device and meshed for proper rendering. Each DEntry is representative of one or more artefact or label (or a combination of both) and includes coordinate information (also referred to as a "bounding box" or "bounding area") to identify the area covered by the DEntry and a plurality of data points that together represent the artefact, feature or label. For example, a DEntry may be used to represent a street on a city map (or a plurality of streets), wherein the carious points within the DEntry are separated into different parts representing various portions of the artefact or map feature (e.g. portions of the street). A wireless device may issue a request for the map server to download only those DEntries that are included within a specified area or bounding box representing an area of interest that can be represented by, for example, a pair of bottom left, top right coordinates.

Figure 13B:
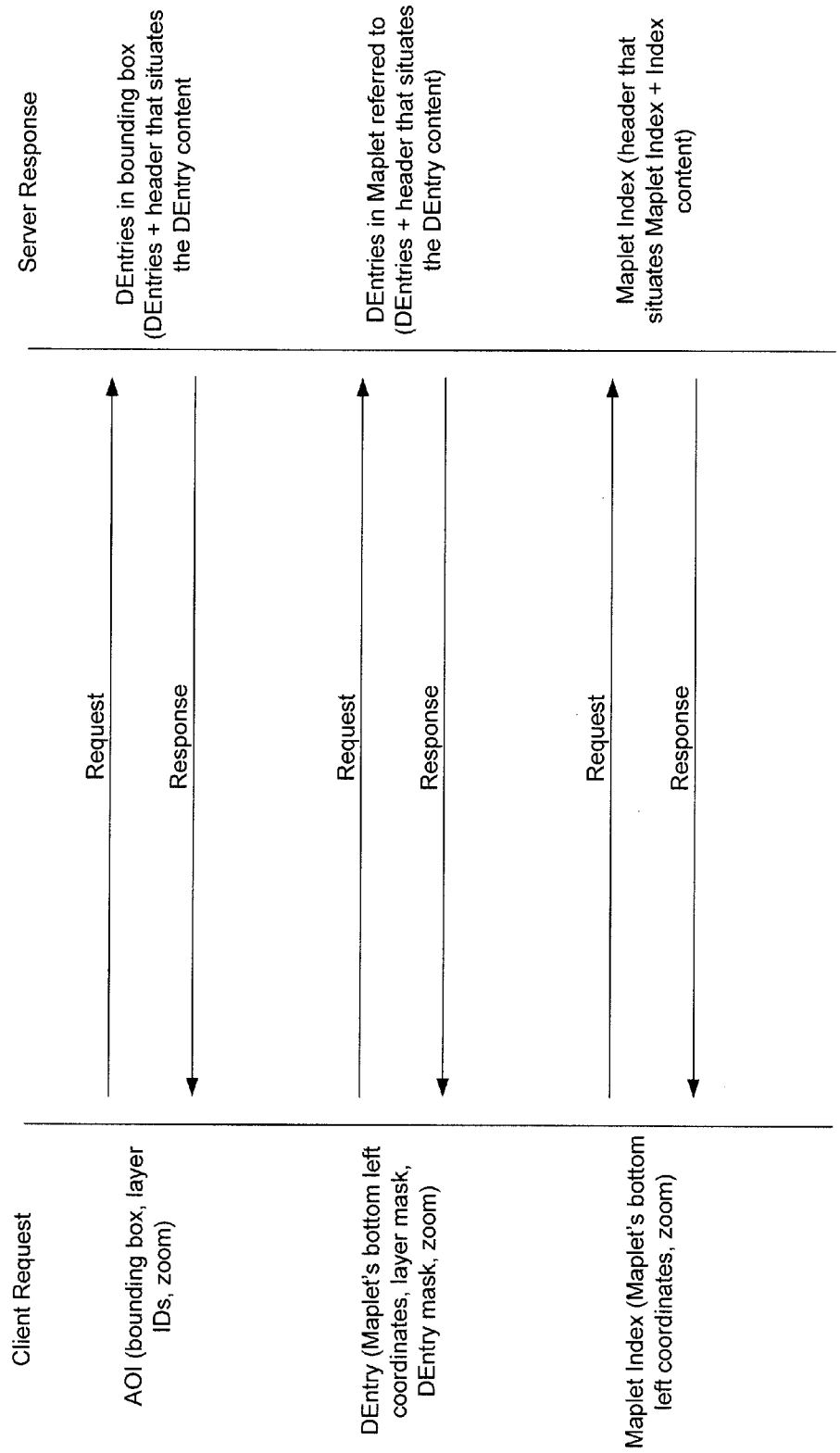
FIG. 13B illustrates a message exchange between a mobile communication device and a map server for downloading map content to the mobile communication device based on the system of FIG. 13A.

As depicted in FIG. 13B, the wireless communications device issues one or more AOI (Area of Interest) requests, DEntry or data requests and Maplet Index requests to the map server for selective downloading of map data based on user context. Thus, rather than transmitting the entire map data for an area in reply to each request from the device (which burdens the wireless link), local caching may be used in conjunction with context filtering of map data on the server. For example, if a user's wireless device is GPS enabled and the user is traveling in an automobile at 120 km/h along a freeway then context filtering can by employed to prevent downloading of map data relating to passing side streets. Or, if the user is traveling in an airplane at 30,000 feet, then context filtering can be employed to prevent downloading of map data for any streets whatsoever. Also, a user's context can be defined, for example, in terms of occupation, e.g. a user whose occupation is a transport truck driver can employ context filtering to prevent downloading of map data for side streets on which the user's truck is incapable of traveling, or a user whose occupation is to replenish supplied of soft drink dispensing machines can employ context filtering to download public map data showing the user's geographical area of responsibility with irrelevant features such as lakes and parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving OTA (Over-the-Air) bandwidth and device memory caching requirements. The Maplet Index conforms to the same data structure as a Maplet, but omits the data points. Consequently, the Maplet Index is small (e.g. 300-400 bytes) relative to the size of a fully populated Maplet or a conventional bit map, and includes DEntry bounding boxes and attributes (size, complexity, etc.) for all artifacts within the Maplet. As the field of view changes (e.g. for a location-aware device that displays a map while moving), the device (client) software assesses whether or not it needs to download additional data from the server. Thus, if the size attribute or complexity attribute of an artefact that has started to move into the field of view of the device (but is not yet being displayed) is not relevant to the viewer's current context, then the device can choose not to display that portion of the artifact. On the other hand, if the portion of the artefact is appropriate for display, then the device accesses its cache to determine whether the DEntries associated with that portion of the artefact have already been downloaded, in which case the cached content is displayed. Otherwise, the device issues a request for the map server to download all the of the DEntries associated with the artifact portion.

By organizing the Maplet data structure in Layers, it is possible to seamlessly combine and display information obtained from public and private databases. For example, it is possible for the device to display an office building at a certain address on a street (e.g. a $1^{st}$ z-order attribute from public database), adjacent a river (e.g. a $2^{nd}$ z-order attribute from public database), with a superimposed floor plane of the building to show individual offices (e.g. $11^{th}$ z-order attribute from a private database, accessible through a firewall).

Referring back to FIG. 3A, within the network having map server(s) and/or LBS server(s) 321 and databases) 322 accessible to it, all of the map data for the entire world is divided and stored as a grid according to various levels of resolution (zoom), as set forth below in Table A. Thus, a single A-level Maplet represents a 0.05×0.05 degree grid area; a single B-level Maplet represents a 0.5×0.5 degree grid area; a single C-level Maplet represents a 5×5 degree grid area; a single D-level Maplet represents a 50×50 degree grid area; and a single E level Maplet represents the entire world in a single Maplet. It is understood that Table A is only an example of a particular Maplet grid division; different grid divisions having finer or coarser granularity may, of courser, be substituted. A Maplet includes a set of layers, with each layer containing a set of DEntries, and each DEntry containing a set of data points.

TABLE A

| Level | Grid (degrees) | # of Maplets to cover the World | # of Maplets to cover North America | # of Maplets to cover Europe |
|---|---|---|---|---|
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

As mentioned above, three specific types of requests may be generated by a wireless communications device (i.e. the client)—AOI requests, DEntry requests and Maplet Index requests. The requests may be generated separately or in various combinations, as discussed in greater detail below. An AOI (area of interest) request calls for all DEntries in a given area (bounding box) for a predetermined or selected set of z-order Layers. The AOI request is usually generated when the device moves to a new area so as to fetch DEntries for display before the device client knows what is available in the Maplet. The Maplet Index has the exact same structure as a maplet but does not contain complete DEntries (i.e. the data Points actually representing artifacts and labels are omitted). Thus, a Maplet Index defines what Layers and DEntries are available for a given Maplet. A data or DEntry request is a mechanism to bundle together all of the required Dentries for a given Maplet.

Typically, AOI and Maplet Index requests are paired together in the same message, although they need not be, while DEntry requests are generated most often. For example, when a wireless device moves into an area for which no information has been stored on the device client, the Maplet Index request returns a Maplet Index that indicates what data the client can specifically request from the server 321, while the AOI request returns any DEntries within the area of interest for the specified Layers (if they exist). In the example requests shown on FIG. 13B, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

In this particular implementation, a collection of 20× A-level Maplets (representing a 1×1 degree square) is compiled into a Maplet Block File (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
|---|---|---|
| 0x000 | Maplet #0 Offset (4 bytes) | Maplet #0 Length (4 bytes) |
| 0x008 | Maplet #1 Offset | Maplet #1 Length |
| 0x010 | Maplet #2 Offset | Maplet #2 Length |
| ... | ... | ... |
| 0xC78 | Maplet #399 Offset | Maplet #399 Length |
| 0xC80 | Beginning of Maplet #0 | |
| 0xC80 + Size of Maplet #0 | Beginning of Maplet #1 | |
| 0xC80 + Size of Maplet #0 + #1 | Beginning of Maplet #2 | |
| ... | ... | |
| 0xC80 + Σ of Size of Maplets (#0: #398) | Beginning of Maplet #399 | |

In Table B, the offset of Maplet #0 is 0x0000_0000 since, in this particular example, the data structure is based on the assumption that the base address for the actual Maplet data is 0x0000_0C80. Therefore the absolute address for Maplet #0 data is: Maplet #0 Address=Base Address (0x0000_0C80)+ Maplet #0 Offset (0x0000_0000), and additional Maplet addresses are calculated as: Maplet #(n+1) Offset=Maplet #(n) Offset+Maplet #(n) Length. If a Maplet has no data or does not exist, the length parameter is set to zero (0x0000_0000).

TABLE C

| Address Offset | Offset (4 bytes) | Length (4 bytes) |
|---|---|---|
| 0x000 | Maplet Index #0 Offset | Maplet Index #0 Length |
| 0x008 | Maplet Index #1 Offset | Maplet Index #1 Length |
| 0x010 | Maplet Index #2 Offset | Maplet Index #2 Length |
| ... | ... | ... |
| 0xC78 | Maplet Index #399 Offset | Maplet Index #399 Length |
| 0xC80 | Beginning of Maplet Index #0 | |
| 0xC80 + Size of Maplet Index #0 | Beginning of Maplet Index #1 | |
| 0xC80 + Size of Maplet Index #0 + #1 | Beginning of Maplet Index #2 | |
| ... | ... | |
| 0xC80 + Σ of Size of Maplet Indices (#0: #399) | Beginning of Maplet Index #399 | |

In Table C, the offset of Maplet Index #0 is 0x0000_0000 since, according to an exemplary embodiment the data structure is based on the assumption that the base address for the actual Maplet index data is 0x0000_0C80. Therefore, the absolute address for Maplet Index #0 data is: Maplet Index #0 Address=Base Address (0x0000_0C80)+Maplet Index #0 Offset (0x0000_0000), and additional Maplet index addresses are calculated as: Maplet Index #(n+1) Offset=Maplet Index #(n) Offset+Maplet Index #(n) Length. If a Maplet Index has no data or does not exist, the length parameter is set to zero (0x0000_0000).

Figure 13C:
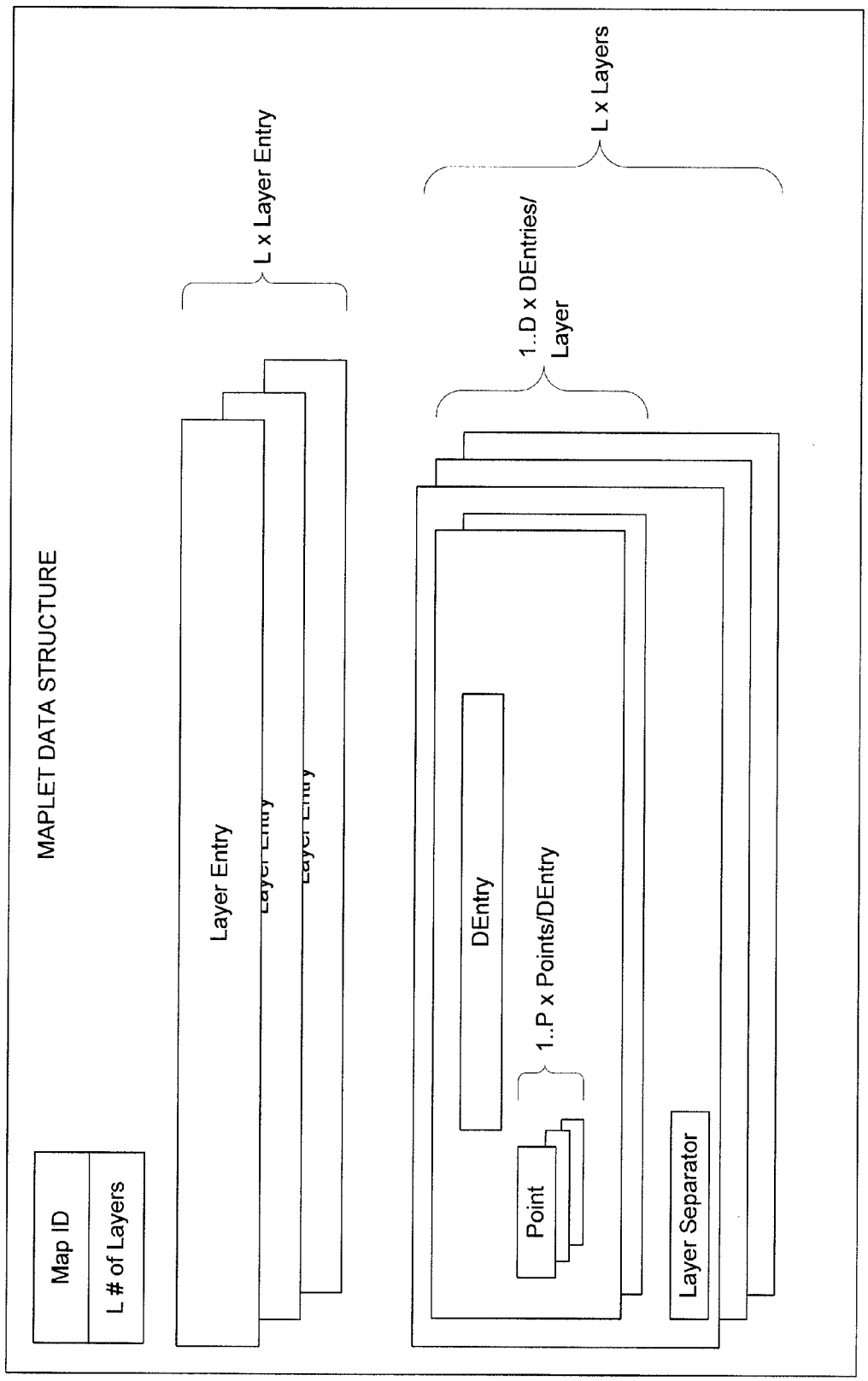
FIG. 13C is a diagram showing a Maplet data structure according to an exemplary embodiment for use with implementations of the present technology.

FIG. 13C and Table D (below), in combination, illustrate, by way of example only, a basic Maplet data structure. Generally, as noted above, the Maplet data structure can be said to include a Maplet Index (i.e. an index of the DEntries, each of which is representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries) in the Maplet. Each Layer Entry defines rendering attributes and is followed by a list of DEntries for each Layer. The above forms a Maplet Index. For a complete Maplet, each DEntry contains a set of data Points (referred to herein as oPoints) or Labels). It will be noted that Layers can have multiple DEntries and the complete list of DEntries and Points are grouped by Layer and separated by a Layer Separator (e.g. hex value 0xEEEEEEEE). In this example, each Layer Entry is 20 bytes long, and a DEntry is 12 bytes long. However, the number of Layers, number of DEntries per Layer and the number of Points per DEntry depends on the map data and is generally variable.

Table D provides a high "byte-level" description of a Maplet for this example.

TABLE D

| Data | Quantity | Total # of Bytes |
| --- | --- | --- |
| Map ID | 1 | 4 bytes |
| # of Layers | 1 | 4 bytes |
| Layer Entries | # of Layers | 20 bytes x (# of Layers) |
| DEntry of a Layer | x (# of DEntries in a Layer) | # of Layers | 12 bytes x (Σ of the # of DEntries in each Layer) + |
| Points for DEntry of a Layer | | | 4 bytes x (2 of the # of Points in each DEntry in each Layer) + |
| Layer Separator | | | 4 bytes x (# of Layers) |

This new technology has been described in terms of specific implementations and configurations which are intended to be exemplary only. The scope of the exclusive right sought by the Applicant is therefore intended to be limited solely by the appended claims.

The invention claimed is:

1. A method of distributing map data from a map server to a wireless communications device, the method comprising:
   obtaining vector map data in response to a request for map data received at the map server from the wireless communications device;
   generating a bitmap array that is a low-resolution representation of the vector map data for a particular location specified in the request;
   computing attributes of the bitmap array to determine which map features are to be retained and which map features are to be omitted;
   simplifying the map data by omitting at least one map feature to thereby provide simplified map data; and
   transmitting to the wireless communications device only the simplified map data for the map features to be retained.

2. The method as claimed in claim 1 wherein computing attributes of the bitmap array comprises determining whether any polygonal map features are to be omitted.

3. The method as claimed in claim 2 wherein determining whether any polygonal map features are to be removed comprises calculating the total number of bitmap cells in the bitmap array for each polygonal map feature to thus approximate its polygonal area and determining whether the total number of bitmap cells is less than a polygonal area threshold below which the polygonal map feature is to be omitted.

4. The method as claimed in claim 1 wherein computing attributes comprises:
   marking bitmap cells in the bitmap array corresponding to a first map feature;
   marking bitmap cells in the bitmap array corresponding to a second map feature provided that the bitmap cells to be marked for the second map feature do not coincide with the bitmap cells already marked for the first map feature, thus providing a tally of marked cells and unmarked cells for the second map feature with respect to the first map feature; and comparing a ratio of the marked cells to the unmarked cells against a threshold to determine whether the second map feature is considered to overlap the first map feature.

5. The method as claimed in claim 4 further comprising prioritizing the map features based on metadata characteristics of the map features so as to determine an appropriate order of priority for populating the cells of the bitmap array.

6. The method as claimed in claim 5 wherein the map features are roadways and wherein prioritizing is done according to one or more of a plurality of factors consisting of: a class of the roadway, an importance rating of the roadway, a speed limit associated with the roadway, and a length of the roadway.

7. The method as claimed in claim 1 wherein computing attributes comprises:
   marking bitmap cells in the bitmap array corresponding to a first map feature while also marking neighbouring bitmap cells to define a buffer of buffer cells immediately on each side of the bitmap cells corresponding the first map feature;
   marking bitmap cells in the bitmap array corresponding to a second map feature provided that the bitmap cells to be marked for the second map feature do not coincide with the bitmap cells already marked for the first map feature or with the buffer cells of the first map feature, thus providing a tally of marked cells and unmarked cells for the second map feature with respect to the first map feature and its buffer; and
   comparing a ratio of the marked cells to the unmarked cells against a threshold to determine whether the second map feature is considered to either overlap or be too proximate to the first map feature.

8. The method as claimed in claim 1 wherein the map data transmitted to the wireless communications device comprises only the vector map data for the map features to be retained.

9. The method as claimed in claim 1 wherein the map data transmitted to the wireless communications device comprises the bitmap data generated by collapsing the vector map data into the bitmap array.

10. The method as claimed in claim 1 wherein the map data is pre-processed on the map server for a plurality of different zoom levels.

11. The method as claimed in claim 1 wherein the map data is processed in real-time on the map server.

12. The method as claimed in claim 1 further comprising adjusting performance of map rendering on the device by tuning one or more of a plurality of tuneable parameters in order to adjust a degree of map detail to be provided, wherein the parameters include a bitmap size, a bitmap resolution, a threshold for determining when a map feature is to be omitted and a width of a buffer for determining when a map feature is to be omitted because of its excessive proximity to another map feature.

13. A computer-readable medium comprising code which, when loaded into memory and executed on a processor of a map server, is adapted to cause the server to:
 obtain vector map data in response to a request for map data received at the map server from the wireless communications device;
 generate a bitmap array that is a low-resolution representation of the vector map data for a zoom level specified in the request;
 compute attributes of the bitmap array to determine which map features are to be retained and which map features are to be omitted;
 simplify the map data by omitting at least one map feature to thereby provide simplified map data; and
 transmit to the wireless communications device only the simplified map data for the map features to be retained.

14. The computer-readable medium as claimed in claim 13 wherein computing attributes of the bitmap array comprises determining whether any polygonal map features are to be omitted.

15. The computer-readable medium as claimed in claim 14 wherein determining whether any polygonal map features are to be removed comprises calculating the total number of bitmap cells in the bitmap array for each polygonal map feature to thus approximate its polygonal area and determining whether the total number of bitmap cells is less than a polygonal area threshold below which the polygonal map feature is to be omitted.

16. The computer-readable medium as claimed in claim 13 wherein computing attributes comprises: marking bitmap cells in the bitmap array corresponding to a first map feature; marking bitmap cells in the bitmap array corresponding to a second map feature provided that the bitmap cells to be marked for the second map feature do not coincide with the bitmap cells already marked for the first map feature, thus providing a tally of marked cells and unmarked cells for the second map feature with respect to the first map feature; and comparing a ratio of the marked cells to the unmarked cells against a threshold to determine whether the second map feature is considered to overlap the first map feature.

17. A map server for distributing map data to the wireless communications devices, the server comprising:
 a data port for receiving a request from the wireless communications device for map data; and
 a processor coupled to memory to:
 process the request and obtain vector map data in response to the request for map data;
 generate a bitmap array that is a low-resolution representation of the vector map data for a zoom level specified in the request;
 compute attributes of the bitmap array to determine which map features are to be retained and which map features are to be omitted;
 simplify the map data by omitting at least one map feature to thereby provide simplified map data; and
 transmit to the wireless communications device, via the data port, only the simplified map data for the map features to be retained.

18. The map server as claimed in claim 17 wherein the bitmap array is used to determine whether any polygonal map features are to be omitted.

19. The map server as claimed in claim 18 wherein the total number of bitmap cells in the bitmap array for each polygonal map feature is calculated to thus approximate its polygonal area so as to determine whether the total number of bitmap cells is less than a polygonal area threshold below which the polygonal map feature is to be omitted.

20. The map server as claimed in claim 17 wherein the map features are analyzed by:
 marking bitmap cells in the bitmap array corresponding to a first map feature;
 marking bitmap cells in the bitmap array corresponding to a second map feature provided that the bitmap cells to be marked for the second map feature do not coincide with the bitmap cells already marked for the first map feature, thus providing a tally of marked cells and unmarked cells for the second map feature with respect to the first map feature; and
 comparing a ratio of the marked cells to the unmarked cells against a threshold to determine whether the second map feature is considered to overlap the first map feature.

21. The map server as claimed in claim 17 wherein the map features are analyzed by:
 marking bitmap cells in the bitmap array corresponding to a first map feature while also marking neighbouring bitmap cells to define a buffer of buffer cells immediately on each side of the bitmap cells corresponding the first map feature;
 marking bitmap cells in the bitmap array corresponding to a second map feature provided that the bitmap cells to be marked for the second map feature do not coincide with the bitmap cells already marked for the first map feature or with the buffer cells of the first map feature, thus providing a tally of marked cells and unmarked cells for the second map feature with respect to the first map feature and its buffer; and
 comparing a ratio of the marked cells to the unmarked cells against a threshold to determine whether the second map feature is considered to either overlap or be too proximate to the first map feature.

22. The map server as claimed in claim 17 wherein the map server transmits to the wireless communications device only the vector map data for the map features to be retained.

23. The map server as claimed in claim 17 wherein the map server transmits to the wireless communications device the bitmap data generated by collapsing the vector map data into the bitmap array.

24. The map server as claimed in claim 17 wherein the map server stores pre-processed map data for a plurality of different zoom levels.

25. The map server as claimed in claim 17 wherein the map server processes the map data in real-time.

26. The map server as claimed in claim 17 comprising a plurality of tuneable parameters in order to vary map detail, wherein the parameters include a bitmap size, a bitmap resolution, a threshold for determining when a map feature is to be omitted and a width of a buffer for determining when a map feature is to be omitted because of its excessive proximity to another map feature.

* * * * *